United States Patent
Pritz et al.

(10) Patent No.: US 12,092,883 B2
(45) Date of Patent: Sep. 17, 2024

(54) CIRCUIT BOARD CONNECTOR FOR OPTICAL WAVEGUIDES

(71) Applicant: MD Elektronik GmbH, Waldkraiburg (DE)

(72) Inventors: Helmut Pritz, Ampfing (DE); Thomas Halbig, Dietfurt (DE)

(73) Assignee: MD ELEKTRONIK GMBH, Waldkraiburg (DE)

( * ) Notice: Subject to any disclaimer, the term of this patent is extended or adjusted under 35 U.S.C. 154(b) by 114 days.

(21) Appl. No.: 17/959,384

(22) Filed: Oct. 4, 2022

(65) Prior Publication Data
US 2023/0120026 A1     Apr. 20, 2023

(30) Foreign Application Priority Data

Oct. 19, 2021 (DE) ................ 10 2021 127 031.6

(51) Int. Cl.
*H04B 10/00* (2013.01)
*G02B 6/32* (2006.01)
*G02B 6/42* (2006.01)

(52) U.S. Cl.
CPC .......... *G02B 6/4292* (2013.01); *G02B 6/322* (2013.01); *G02B 6/4284* (2013.01)

(58) Field of Classification Search
CPC .... G02B 6/4292; G02B 6/322; G02B 6/4284; G02B 6/32; G02B 6/4214; G02B 6/4246; G02B 6/3897
See application file for complete search history.

(56) References Cited

U.S. PATENT DOCUMENTS

| | | | | |
|---|---|---|---|---|
| 6,729,771 B2* | 5/2004 | Kim | ...... | G02B 6/4249 385/76 |
| 6,934,450 B2* | 8/2005 | Hiramatsu | ...... | G02B 6/4292 385/139 |
| 7,371,014 B2* | 5/2008 | Willis | ...... | G02B 6/4204 385/24 |
| 7,399,125 B1* | 7/2008 | Whaley | ...... | G02B 6/4204 385/88 |
| 7,441,965 B2* | 10/2008 | Furuno | ...... | G02B 6/4292 385/32 |

(Continued)

FOREIGN PATENT DOCUMENTS

DE     102020110237 B4     11/2021
JP        2008224954 A       9/2008

*Primary Examiner* — Agustin Bello
(74) *Attorney, Agent, or Firm* — LEYDIG, VOIT & MAYER, LTD.

(57) ABSTRACT

A connector for connecting a circuit board to a mating connector includes a connector housing, a lens unit and a receiving unit. The connector housing has a receiving chamber and is connectable to a mating connector housing of the mating connector. The lens unit is disposed in the receiving chamber and is light-conductively connectable to a transmitter/receiver unit disposed on the circuit board and to at least one optical waveguide of the mating connector. The securing unit has two mounting arms and a securing portion connecting the mounting arms, the securing unit being releasably connected via the mounting arms at two opposite side walls of the connector housing, and the securing portion securing the lens unit in place within the receiving chamber.

20 Claims, 3 Drawing Sheets

(56) References Cited

U.S. PATENT DOCUMENTS

| | | | | |
|---|---|---|---|---|
| 8,787,714 B2* | 7/2014 | Morioka | G02B 6/4246 | 385/35 |
| 8,939,657 B2* | 1/2015 | Hung | G02B 6/42 | 385/89 |
| 9,122,025 B2* | 9/2015 | Ishikawa | G02B 6/4204 | |
| 9,134,487 B2* | 9/2015 | Chang | G02B 6/4204 | |
| 9,354,110 B2* | 5/2016 | Lin | G01J 1/0271 | |
| 9,377,594 B2* | 6/2016 | Liff | G02B 6/43 | |
| 9,435,960 B2* | 9/2016 | Huang | G02B 6/322 | |
| 9,645,334 B2* | 5/2017 | Ishii | G02B 6/4269 | |
| 9,857,546 B2* | 1/2018 | Zhang | G02B 6/3882 | |
| 9,983,367 B2* | 5/2018 | Zhang | G02B 6/4269 | |
| 10,151,891 B1* | 12/2018 | Lin | G02B 6/3885 | |
| 10,209,458 B2* | 2/2019 | Kurashima | G02B 6/327 | |
| 10,459,179 B2* | 10/2019 | Lin | G02B 6/4244 | |
| 10,466,427 B2* | 11/2019 | Wang | G02B 6/4292 | |
| 10,976,506 B2* | 4/2021 | Matsui | G02B 6/4249 | |
| 2006/0164738 A1* | 7/2006 | Yamamoto | G02B 6/3829 | 359/871 |
| 2008/0232737 A1* | 9/2008 | Ishigami | G02B 6/4284 | 385/88 |
| 2010/0020421 A1* | 1/2010 | Shimmo | G02B 7/021 | 359/811 |
| 2011/0101255 A1* | 5/2011 | Tamura | G02B 6/4246 | 250/551 |
| 2011/0164851 A1* | 7/2011 | Ishigami | G02B 6/4292 | 385/93 |
| 2011/0293221 A1* | 12/2011 | Kaneshiro | G02B 6/4201 | 385/88 |
| 2013/0022360 A1* | 1/2013 | Matsui | G02B 6/4201 | 398/116 |
| 2013/0343698 A1* | 12/2013 | Ko | G02B 6/4257 | 385/14 |
| 2014/0153881 A1* | 6/2014 | Liff | G02B 6/4214 | 385/89 |
| 2014/0185995 A1* | 7/2014 | Lee | G02B 6/4231 | 156/293 |
| 2015/0016786 A1* | 1/2015 | Chang | G02B 6/4292 | 385/93 |
| 2015/0341066 A1* | 11/2015 | Hsieh | G02B 6/4261 | 361/747 |
| 2015/0362685 A1* | 12/2015 | Shah | G02B 6/4214 | 250/552 |
| 2016/0246019 A1* | 8/2016 | Ishii | G02B 6/4246 |  |
| 2017/0010421 A1* | 1/2017 | Pitwon | G02B 6/389 |  |
| 2017/0090125 A1* | 3/2017 | Kurashima | G02B 6/4231 |  |
| 2017/0090131 A1* | 3/2017 | Zhang | G02B 6/4292 |  |
| 2017/0219786 A1* | 8/2017 | Morioka | G02B 6/4292 |  |
| 2018/0180830 A1* | 6/2018 | Kawamura | G02B 6/4214 |  |
| 2018/0267263 A1* | 9/2018 | Wang | G02B 6/4214 |  |
| 2018/0284359 A1* | 10/2018 | Akieda | G02B 6/3888 |  |
| 2018/0372956 A1* | 12/2018 | Chen | G02B 6/421 |  |
| 2019/0097735 A1* | 3/2019 | Akieda | G02B 6/4266 |  |
| 2019/0187392 A1* | 6/2019 | Wang | G02B 6/3893 |  |
| 2020/0333539 A1* | 10/2020 | Matsui | G02B 6/4249 |  |
| 2023/0120026 A1* | 4/2023 | Pritz | G02B 6/4246 | 385/92 |

* cited by examiner

CIRCUIT BOARD CONNECTOR FOR OPTICAL WAVEGUIDES

CROSS REFERENCE TO RELATED APPLICATIONS

This application claims benefit to German Patent Application No. DE 10 2021 127 031.6, filed on Oct. 19, 2021, which is hereby incorporated by reference herein.

FIELD

The invention relates to a connector for connecting a circuit board to a mating connector. The connector serves to create a light-conducting connection between the circuit board and the mating connector so that light signals can be transmitted between the circuit board and the mating connector.

BACKGROUND

Due to the increasing digitization and miniaturization of products and processes and the resulting ever-increasing amounts of data, there is also an ever-increasing demand for space-saving and cost-effective data connections that enable high data transfer rates. Since optical waveguides are particularly suitable for transmission of high data rates, the use of optical waveguides as data transmission means is becoming increasingly more interesting. The connection of optical waveguides is mostly effected via connector systems, so that the optical waveguide can be releasably connected either to another optical waveguide or to a semiconductor circuit board. Connection to the semiconductor circuit board is typically accomplished using circuit board connectors which are permanently connected to the semiconductor circuit board, for example, by soldering. The permanent connection of the semiconductor circuit board permits easy assembly as well as accurate and rugged mounting of the circuit board connector on the semiconductor circuit board, thereby ensuring that light can be transmitted through the circuit board connector.

SUMMARY

In an embodiment, the present invention provides a connector for connecting a circuit board to a mating connector. The connector includes a connector housing, a lens unit and a receiving unit. The connector housing has a receiving chamber and is connectable to a mating connector housing of the mating connector. The lens unit is disposed in the receiving chamber and is light-conductively connectable to a transmitter/receiver unit disposed on the circuit board and to at least one optical waveguide of the mating connector. The securing unit has two mounting arms and a securing portion connecting the mounting arms, the securing unit being releasably connected via the mounting arms at two opposite side walls of the connector housing, and the securing portion securing the lens unit in place within the receiving chamber.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
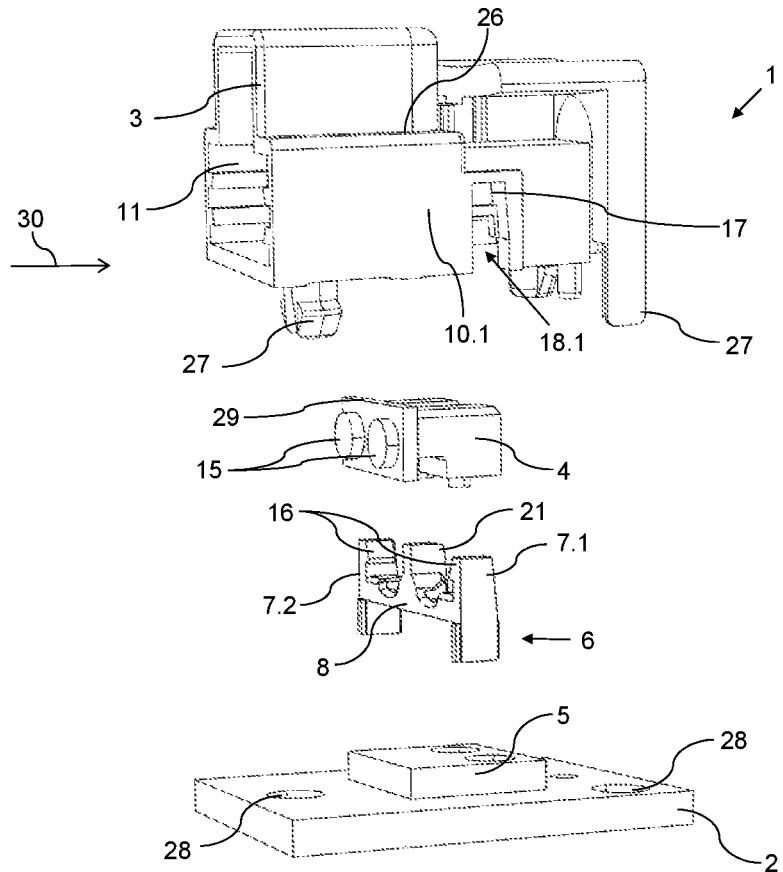
FIG. 1 is a three-dimensional exploded view of a first embodiment of a connector according to the invention.

As raw materials are becoming increasingly scarce, and because of an ever-increasing demand for more sustainable products, permanent attachment of the circuit board connector is associated with several disadvantages. For example, permanent attachment makes recycling significantly more difficult because the components cannot always, or not completely, be separated from one another. Furthermore, the individual components of circuit board connectors for transmitting optical signals are mostly permanently connected together, so that individual components within the circuit board connector are generally not replaceable and thus not repairable. Therefore, a defective circuit board connector generally results in the requirement of replacing the circuit board connector or the entire semiconductor circuit board, depending on the particular application. Hence, existing circuit board connectors are generally recyclable only to a very limited extent.

In an embodiment, the present invention provides a connector which enables a light-conducting connection between a circuit board and an optical waveguide, which overcomes at least one of the disadvantages of the above-mentioned prior art, and which in particular has a higher level of recyclability and reusability.

According to an embodiment of the present invention, an inventive connector for connecting a circuit board to a mating connector has a connector housing. The connector housing is connectable to a mating connector housing of the mating connector. The connector according to the invention further has a lens unit. The lens unit is connectable to a transmitter/receiver unit disposed on the circuit board. The transmitter/receiver unit may be used for transmitting and/or receiving optical signals. Furthermore, the transmitter/receiver unit may be configured to convert optical signals into electrical signals. Moreover, the lens unit is light-conductively connectable to an optical waveguide of the mating connector. Thus, a light-conducting connection can be established between the optical waveguide of the mating connector and the transmitter/receiver unit of the circuit board via the lens unit. The lens unit may further be configured to redirect the light signals from the optical waveguide and/or from the transmitter/receiver unit so that a higher degree of freedom is provided for the positioning of the optical waveguide relative to the transmitter/receiver unit. For example, a connection plane where a light-conducting connection is created between the transmitter/receiver unit and the lens unit may be oriented at an angle of, for example, 80 to 110 degrees with respect to a connection plane where a light-conducting connection is created between the lens unit and the optical waveguide. In this way, a mating axis along which the connector can be connected to the mating connector can be selected to be parallel to the circuit board. The connector according to an embodiment of the invention has a securing unit. The securing unit has two mounting arms and a securing portion. The securing portion interconnects the mounting arms. It is preferred that the two mounting arms be parallel to each other. The connector housing has a receiving chamber. The lens unit is disposed within the receiving chamber. The receiving chamber is preferably accessible from a side of the connector housing, which allows the lens unit to be inserted into or removed from the receiving space. The securing unit is releasably connected via the mounting arms at two opposite side walls of the connector housing, which, in particular, extend parallel to each other. Preferably, the mounting arms are connected to the connector housing at the sides of the side walls facing away from the receiving chamber. The securing portion of the securing unit secures the lens unit in place in the receiving chamber. It is preferred that the securing portion be disposed between the lens unit and the transmitter/receiver unit when the connector is disposed on the circuit board.

The inventive approach makes it possible to provide a connector for optical data transmission that enables an optical waveguide to be reliably connected to a circuit board while at the same time ensuring that the lens unit of the connector is removable. To this end, it is merely required to remove the securing unit releasably connected to the connector housing, which at the same time releases the positional locking of the lens unit in the receiving chamber. This, on the one hand, enables replacement of a defective lens unit and, on the other hand, enhances the recyclability of the inventive connector since the connector can be non-destructively dismantled into its individual components.

The connector housing may have an insertion chamber. The insertion chamber may be separated from the receiving chamber by a partition. The partition may have at least one connecting opening. A mating connector housing may be at least partially insertable into the insertion chamber. The insertion chamber may further have keying elements to prevent connection to an inappropriate mating connector housing. The connecting opening ensures that light signals can still pass from the mating connector disposed in the insertion chamber into the lens unit in the receiving chamber.

The connector housing may have at least one groove adjacent the partition in the receiving chamber. The groove may extend across several inner surfaces of the receiving chamber. Moreover, the groove preferably extends perpendicular to the mating axis. The lens unit may be disposed at least partially within the groove. The lens unit may, for example, have a flange which may correspond to the negative shape of the groove and may be disposed in the groove. Thus, since the groove is immediately adjacent the partition, the lens unit can be fixed against the groove and against the partition, thereby reducing the risk of inadvertent movement of the lens unit in the receiving chamber.

The lens unit may have at least one coupling portion extending through the connecting opening into the insertion chamber. The coupling portion may have an outer contour that corresponds to the contour of the connecting opening. If the partition has a plurality of openings, the lens unit may have a plurality of coupling portions. It is particularly preferred here that each connecting opening can be associated with one coupling portion. The coupling portion can be used both to allow for a simplified light-conducting connection between the lens unit and the optical waveguide and to provide additional positioning of the lens unit in the receiving chamber.

The mounting arms may each have a first connecting element. The first connecting element may be, for example, a latching element, such as a latch or snap hook. The side walls of the connector housing may have second connecting elements configured complementarily to the first connecting elements. The first connecting elements may be, in particular mechanically, connected to the second connecting elements. The connection is preferably effected by friction fit and/or interlocking fit.

The side walls of the connector housing may have guide portions in which the mounting arms of the securing unit are guided. The guide portions may be formed, for example, by recesses, which may particularly preferably be at least partially connected to the receiving chamber. Furthermore, the second connecting elements may be disposed within the guide portions.

The guide portions preferably extend from a bottom side, at which the connector housing is connectable to the circuit board, toward a top side disposed opposite the bottom side. Furthermore, the guide portions may extend perpendicular to the mating axis, preferably adjoining the bottom side. Moreover, it may be advantageous if the guide portions are spaced apart from the top side.

In addition, the guide portions may taper with increasing distance from the bottom side. For example, a distance between two opposite sides that define the guide portions may decrease with increasing distance from the bottom side. The taper may both be continuous or stepped. The taper allows the lens unit to be fixed in a plurality of dimensions, since during movement of the securing unit within the guide portions, the acting forces can be split up.

The mounting arms of the securing unit may be connected to the guide portions by friction fit. In this context, it is preferred that a mounting arm be frictionally connected to the guide portion in which the respective mounting arm is disposed. The frictional connection may be created, for example, by a press-fit connection. If the receiving chamber is connected to the guide portions, the receiving chamber can be sealed in particular by means of a press-fit connection, so that the receiving chamber remains free of dirt during normal use.

The connector housing may have a web within the receiving chamber, against which bears the securing portion of the securing unit. The web preferably extends from a side of the receiving chamber facing the top side toward the bottom side. Furthermore, the web is preferably parallel to the side walls. The web may be used for more accurate positioning of the lens unit in the receiving chamber. Moreover, the bearing of the securing portion against the web allows the lens unit to be secured in place to a greater extent in the receiving chamber.

The lens unit may have a recess in which the web is disposed. The recess may at least partially correspond to the negative shape of the web. Thus, the lens unit can be positioned within the receiving chamber particularly readily with the aid of the web.

The securing portion may have a rib which is passed through a through-opening in the lens unit and bears against the web. The rib may be parallel to the mounting arms. If the lens unit has a plurality of coupling portions, it is preferred that the through-opening be disposed in a plane extending between at least two coupling portions. The rib can additionally prevent the lens unit from rotating or tilting within the receiving chamber.

The web may form a slope on a narrow side where the rib bears against the web. The rib may have a contact surface complementary to the slope. If the guide portions are tapered, it is particularly preferred that the slope be disposed at an angle corresponding to a taper angle of the guide portions.

The connector housing is releasably connectable to the circuit board. To this end, the connector housing may, for example, have latching noses on the bottom side, which are engageable in latch openings provided for this purpose in the circuit board.

The transmitter/receiver unit may be capable of being disposed in the receiving chamber. For this purpose, the receiving chamber may be formed in the region of the bottom side with a contour that is at least partially matched to the transmitter/receiver unit.

FIG. 1 shows an exploded view of a first embodiment of the connector 1 according to the invention. Connector 1 is suitable to be light-conductively connected to a circuit board 2. Connector 1 is further configured to be connected to a mating connector so that a light-conducting connection can be created between the mating connector and the circuit board. Connector 1 has a connector housing 3, a lens unit 4, and a securing unit 6. Lens unit 4 can be light-conductively connected to a transmitter/receiver unit 5 on circuit board 2. Furthermore, lens unit 4 can be light-conductively connected to an optical waveguide of a mating connector. Lens unit 4 can be disposed within the connector housing 3. For purposes of more accurate positioning, the lens unit has a flange 29.

Securing unit 6 is made up of two mounting arms 7.1; 7.2, a securing portion 8, and a rib 21. Mounting arms 7.1; 7.2 are interconnected by securing portion 8. The two mounting arms 7.1; 7.2 each have a first connecting element 16. In the present embodiment, first connecting element 16 is configured as a latch hook. Securing unit 6 can be releasably connected to connector housing 3 with the aid of first connecting elements 16. For this purpose, connector housing 3 has second connecting elements 17 in the form of latch receptacles disposed at side walls 10.1 of connector housing 3. For a more accurate positioning of securing unit 6 on connector housing 3, connector housing 3 has guide portions 18.1 at side walls 10.1, in which guide portions the mounting arms 7.1; 7.2 can be disposed. In the present embodiment, second connecting elements 17 are disposed within guide portions 18.1. Guide portions 18.1 extend from a bottom side toward a top side 26 opposite the bottom side. Furthermore, guide portions 18.1 are configured to taper with increasing distance from the bottom side.

Connector housing 3 has an insertion chamber 11 into which a mating connector housing can be inserted. In doing so, the mating connector housing is inserted into insertion chamber 11 in a direction parallel to mating axis 30. Connector housing 3 also has three latching noses 27 by which connector housing 3 is secured to circuit board 2. Circuit board 2 has corresponding latch openings 28 into which the latching noses can be inserted.

Figure 2:
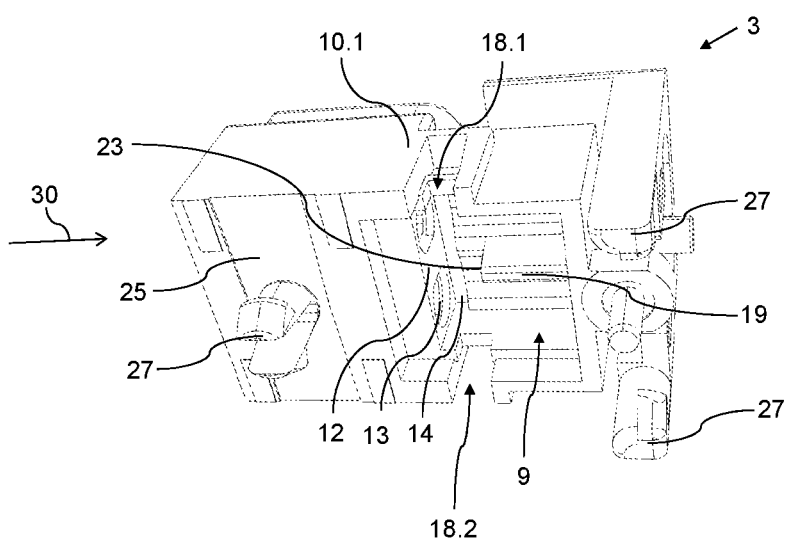
FIG. 2 is a three-dimensional view of a connector housing of the inventive connector according to the first embodiment.

FIG. 2 shows a three-dimensional view of the connector housing 3 according to the first embodiment of the inventive connector 1. Bottom side 25 of connector housing 3 faces the viewer. Connector housing 3 has a receiving chamber 9 into which the lens unit is insertable. In the present embodiment, receiving chamber 9 is accessible through bottom side 25. Receiving chamber 9 is separated from the insertion chamber by a partition 12. Partition 12 has two connecting openings 13 disposed therein to still enable a light-conducting connection between the lens unit and the optical waveguide of the mating connector. Within receiving chamber 9, connector housing 3 has a groove 14 disposed adjacent to partition 12. Groove 14 serves to receive the flange of the lens unit, thereby enabling a more accurate positioning of the lens unit in receiving chamber 9. Connector housing 3 has a web 19 in receiving chamber 9, the web extending parallel to a mating axis 30 toward bottom side 30 from a wall of the receiving chamber 9 facing the top side. Web 19 also serves to position the lens unit within receiving chamber 9. In addition, the securing unit can be supported on a narrow side 23 of web 19.

Figure 3:
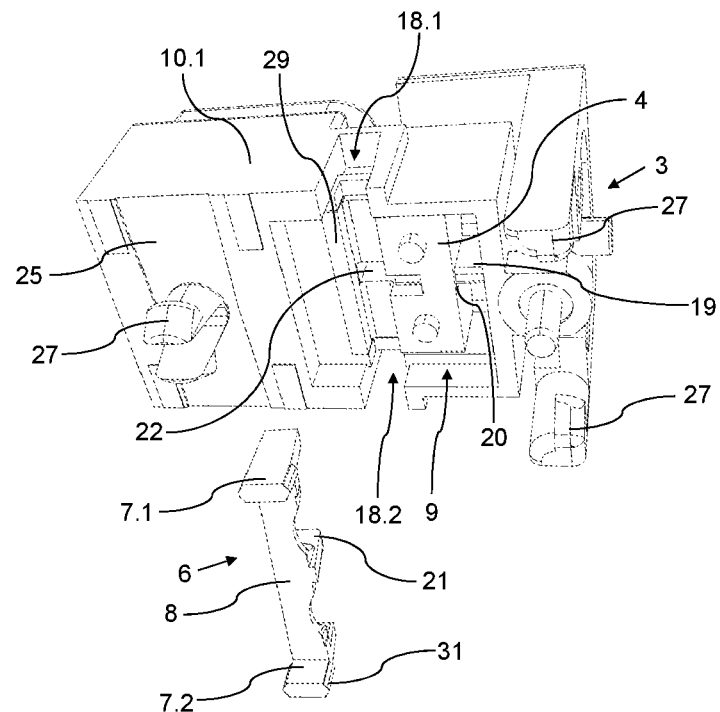
FIG. 3 is a three-dimensional view of a connector housing and a lens unit of the inventive connector according to the first embodiment.

FIG. 3 shows the connector housing 3 according to the first embodiment of the inventive connector 1 in a three-dimensional view, with lens unit 4 disposed in receiving chamber 9. Furthermore, securing unit 6 is already pre-positioned for connection to connector housing 3. Flange 29 of lens unit 4 is inserted in the groove. Moreover, lens unit 4 has a recess 20 in which web 19 of connector housing 3 is disposed. In addition to recess 20, lens unit 4 has a through-opening 22 through which rib 21 of securing unit 6 can be passed.

Figure 4:
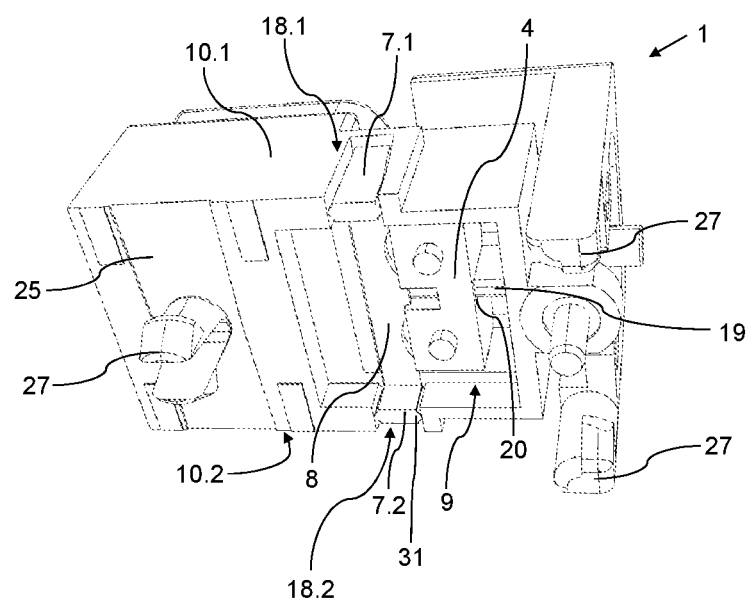
FIG. 4 is a three-dimensional view of a connector housing, a lens unit, and a securing unit of the inventive connector according to the first embodiment.

FIG. 4 shows a three-dimensional view of the inventive connector 1 according to the first embodiment. Bottom side 25 of connector housing 3 faces the viewer. Securing unit 6 is connected to connector housing 3 at side walls 10.1; 10.2, the mounting arms 7.1; 7.2 being guided in guide portions 18.1; 18.2. Both mounting arms 7.1; 7.2 have additional squeezing ribs 31 that create an additional frictional connection between connector housing 3 and securing unit 6. Squeezing ribs 31 offer the additional advantage of sealing receiving chamber 9 in the region of guide portions 18.1; 18.2 against ingress of dust and dirt from the outside. Securing portion 8 secures lens unit 4 in place within receiving chamber 9 so that lens unit 4 is maintained in a stationary position relative to connector housing 3. The position of securing portion 8 is selected such that sufficient free space remains between bottom side 25 and securing portion 8 in receiving chamber 9 to allow the transmitter/receiver unit to be disposed within receiving chamber 9.

Figure 5:
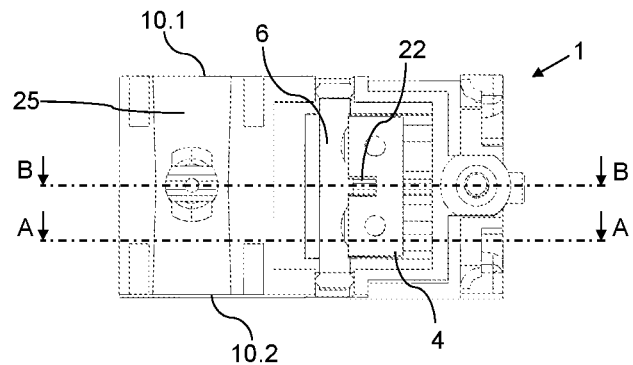
FIG. 5 is a plan view of the inventive connector according to the first embodiment.

FIG. 5 shows a two-dimensional plan view of the inventive connector 1 according to the first embodiment. Bottom side 25 faces the viewer. Two sectional planes A-A and B-B are drawn through connector 1, the sectional planes being parallel to side walls 10.1; 10.2.

Figure 6:
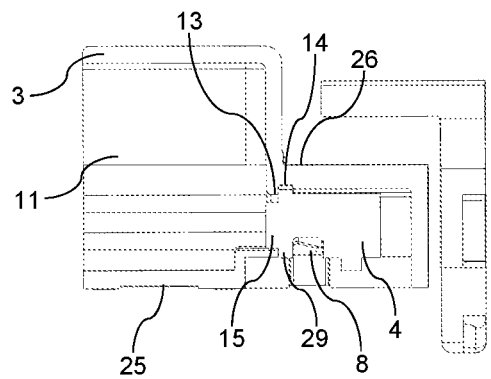
FIG. 6 is a sectional view, taken along a sectional plane A-A, of the inventive connector according to the first embodiment.

FIG. 6 shows a sectional view taken along sectional plane A-A of the inventive connector 1 according to the first embodiment. Lens unit 4 has coupling portions 15 extending through connecting openings 13 into insertion chamber 11. Coupling portions 15 are essentially used for light-conducting connection to the mating connector. It can also be seen that flange 29 of lens unit 4 is disposed within groove 14.

Figure 7:
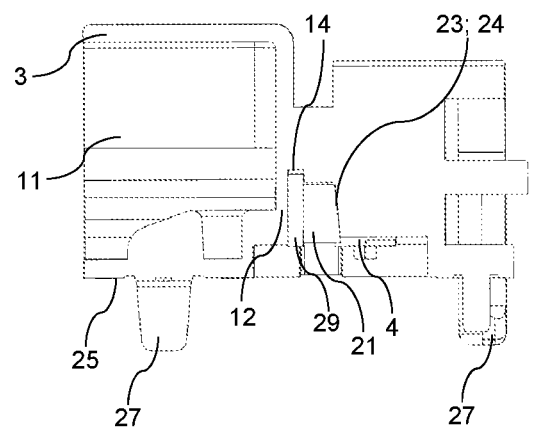
FIG. 7 is a sectional view, taken along a sectional plane B-B, of the inventive connector according to the first embodiment.

FIG. 7 shows a sectional view taken along sectional plane B-B of the inventive connector 1 according to the first embodiment. Rib 21 of securing unit 6 bears with a contact surface 24 against narrow side 23 of web 19. Narrow side 23 of web 19 forms a slope, the contact surface 24 of web 19 having a shape complementary to the slope. This makes it possible to produce a component force by means of which rib 21 presses lens unit 4 against partition 12, thus allowing the lens unit 4 to be fixed in a stationary position more easily.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 connector
2 circuit board
3 connector housing
4 lens unit
5 transmitter/receiver unit
6 securing unit
7 mounting arms
8 securing portion
9 receiving chamber
10 side walls
11 insertion chamber
12 partition
13 connecting opening
14 groove
15 coupling portion
16 first connecting element
17 second connecting element
18 guide portions
19 web
20 recess
21 rib
22 through-opening
23 narrow side
24 contact surface
25 bottom side
26 top side
27 latching noses
28 latch openings
29 flange
30 mating axis
31 squeezing rib

What is claimed is:

1. A connector for connecting a circuit board to a mating connector, the connector comprising:
   a connector housing having a receiving chamber and being connectable to a mating connector housing of the mating connector;
   a lens unit which is disposed in the receiving chamber and is light-conductively connectable to a transmitter/receiver unit disposed on the circuit board and to at least one optical waveguide of the mating connector; and
   a securing unit having two mounting arms and a securing portion connecting the mounting arms, the securing unit being releasably connected via the mounting arms at two opposite side walls of the connector housing, and the securing portion securing the lens unit in place within the receiving chamber.

2. The connector as recited in claim 1, wherein the connector housing has an insertion chamber which is separated from the receiving chamber by a partition, the partition having at least one connecting opening.

3. The connector as recited in claim 2, wherein the connector housing has at least one groove adjacent the partition in the receiving chamber, the lens unit being at least partially disposed in the groove.

4. The connector as recited in claim 2, wherein the lens unit has at least one coupling portion extending through the connecting opening into the insertion chamber.

5. The connector as recited in claim 1, wherein the mounting arms each have a first connecting element, which are each connectable to a second connecting element configured complementarily to the first connecting element at the side walls of the connector housing.

6. The connector as recited in claim 1, wherein the side walls of the connector housing have guide portions in which the mounting arms of the securing unit are guided.

7. The connector as recited in claim 6, wherein the guide portions extend from a bottom side, at which the connector housing is connectable to the circuit board, toward a top side disposed opposite the bottom side.

8. The connector as recited in claim 7, wherein the guide portions taper with increasing distance from the bottom side.

9. The connector as recited in claim 6, wherein the mounting arms are connected to the guide portions by friction fit.

10. The connector as recited in claim 1, wherein the connector housing has a web within the receiving chamber, the securing portion bearing against the web.

11. The connector as recited in claim 10, wherein the lens unit has a recess in which the web is disposed.

12. The connector as recited in claim 10, wherein the securing portion has a rib which is passed through a through-opening in the lens unit and bears against the web.

13. The connector as recited in claim 12, wherein the web forms a slope on a narrow side where the rib bears against the web, and the rib has a contact surface complementary to the slope.

14. The connector as recited in claim 1, wherein the connector housing is releasably connectable to the circuit board.

15. The connector as recited in claim 1, wherein the receiving chamber is configured to receive the transmitter/receiver unit therein.

16. The connector as recited in claim 5, wherein the first connecting elements are configured as latching elements.

17. The connector as recited in claim 1, wherein the securing unit is releasably connected to the connector housing by cooperation of latching elements on the mounting arms and the side walls of the connector housing that are configured to engage with each other.

18. The connector as recited in claim 17, wherein the mounting arms comprise squeezing ribs configured to create an additional frictional connection between the securing unit and the connector housing.

19. The connector as recited in claim 18, wherein the side walls of the connector housing have guide portions in which the mounting arms of the securing unit are guided, and wherein the squeezing ribs seal the receiving chamber in a region of the guide portions against ingress of dust and dirt.

20. The connector as recited in claim 1, wherein the connector housing includes one or more latching noses configured to releasably connect with one or more latch openings in the circuit board.

\* \* \* \* \*